United States Patent
Sogihara

(10) Patent No.: US 7,813,847 B2
(45) Date of Patent: Oct. 12, 2010

(54) ELECTRIC CAR CONTROLLER

(75) Inventor: Hideki Sogihara, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 434 days.

(21) Appl. No.: 11/663,169

(22) PCT Filed: Jan. 25, 2005

(86) PCT No.: PCT/JP2005/000915

§ 371 (c)(1),
(2), (4) Date: Mar. 19, 2007

(87) PCT Pub. No.: WO2006/080046

PCT Pub. Date: Aug. 3, 2006

(65) Prior Publication Data

US 2008/0004760 A1 Jan. 3, 2008

(51) Int. Cl.
*B60L 7/10* (2006.01)
*B60L 5/18* (2006.01)
(52) U.S. Cl. ........................ 701/19; 318/376
(58) Field of Classification Search .................... 701/19; 318/376
See application file for complete search history.

(56) References Cited

U.S. PATENT DOCUMENTS 4,123,693 A * 10/1978 Anderson et al. ........... 318/376
5,283,507 A * 2/1994 Stitt et al. ................... 318/376

FOREIGN PATENT DOCUMENTS

JP        2002-095299 A        3/2002

OTHER PUBLICATIONS

International Search Report for PCT/JP2005/000915 dated Apr. 26, 2005.

* cited by examiner

*Primary Examiner*—Thomas G Black
*Assistant Examiner*—Peter D Nolan
(74) *Attorney, Agent, or Firm*—Buchanan Ingersoll & Rooney PC

(57) ABSTRACT

A power failure section can be accurately detected without depending on a loaded state and application of voltage to the overhead power line can be stopped in a short time when a power failure is detected. An electric car controller includes an overhead power line voltage detector, a band-pass filter for detecting a ripple component included in the detected overhead power line voltage, a comparator for comparing the level of the detected ripple component with a predetermined reference value Vref1, a rheotome control circuit which judges that a power failure has occurred if the ripple component is judged to be smaller than the reference value Vref1 and disconnects the overhead power line from an inverter, a second comparator for comparing the level of the ripple component with a reference value Vref2 larger than the reference value Vref1, and a control circuit which operates if the ripple component is judged to be smaller than the reference value Vref2 to suppress the increase of the overhead power line voltage.

4 Claims, 2 Drawing Sheets

STATE IN WHICH
THERE IS RIPPLE

STATE IN WHICH
THERE IS NO RIPPLE
(OVERHEAD POWER LINE
VOLTAGE IS INCREASED BY
REGENERATIVE OPERATION)

US 7,813,847 B2

ELECTRIC CAR CONTROLLER

TECHNICAL FIELD

The present invention relates to an electric car controller, and more particularly, to an electric car controller for detecting a power failure in a direct current electric car or the like using a rectification power source as a power source.

BACKGROUND ART

An electric car such as a direct current electric car normally collects direct current power from an overhead power line through a pantograph or from a third rail through a collector shoe and runs thereon. Each of the overhead power line or the third rail is composed of a plurality of sections separated from one another. Power is normally supplied from an electric power substation to each of the sections. Because of an abnormality of a power source facility, an abnormality of a car, a work on an overhead power line, or the like, there is the case where power supply is stopped in a section (hereinafter referred to as a power failure section). While the car goes through the power failure section in a regenerative braking state, an increase in overhead power line voltage or a ground fault occurs depending on a state of a load connected with the overhead power line.

Therefore, when the overhead power line voltage exceeds a predetermined value, a conventional drive controller for the electric car determines that the car is going through the power failure section (see, for example, Patent Document 1).

Patent Document 1: JP 2002-95299 A

DISCLOSURE OF THE INVENTION

Problems to be Solved by the Invention

The above-mentioned conventional electric car controller determines that the car is going through the power failure section based on the fact that the overhead power line voltage is higher than a predetermined value at the time of regenerative braking. However, an increase in overhead power line voltage is a phenomenon which occurs in the case where the load connected with the overhead power line is a light load even when the power failure does not occur. Therefore, it is likely to erroneously detect the case of the light load as the case of the power failure section. In addition, there is a problem in that, even in the case of the power failure section, the overhead power line voltage does not increase depending on the state of the load connected with the overhead power line, so the power failure cannot be detected.

When the car enters the power failure section, in the case where the car is on regenerative braking operation, the car operates in a state where no power is supplied at the time of power running. Therefore, a filter capacitor voltage instantaneously reduces, so a filter capacitor low-voltage detection circuit operates, thereby opening a main circuit. During coasting, an input (Es) of an overhead power line voltage detector reduces, so an overhead power line voltage reduction detecting circuit operates, thereby opening the main circuit. In the regenerative braking state, a regenerative state may continue depending on the state of the load connected with the power failure section, with the result that a voltage is applied to the power failure section. Therefore, there is a problem in that, although the power failure section is normally provided to stop the supply of power when some abnormality occurs in a rail or an overhead power line, the voltage is unpreferably applied to the overhead power line by regenerative braking.

The present invention has been made to solve the above-mentioned problems and an object of the present invention is to obtain an electric car controller for accurately detecting the case of the power failure section and stopping the application of the voltage to the overhead power line in a short time at the time of power failure detection without depending on the state of the load.

Means for Solving the Problems

According to the present invention, there is provided an electric car controller for controlling an electric car, provided with an inverter for receiving power supplied through an overhead power line and regenerating power through the overhead power line during a regenerative braking operation and an induction motor driven by the inverter, including: overhead power line voltage detecting means for detecting an overhead power line voltage on the overhead power line; ripple component detecting means for detecting a ripple component included in the overhead power line voltage detected by the overhead power line voltage detecting means; a first comparator means in which a predetermined first reference value is set, for comparing a level of the ripple component outputted from the ripple component detecting means with the first reference value; separation means for determining that a power failure occurs when the ripple component is smaller than the first reference value based on a comparison result obtained by the first comparator means and electrically separating the overhead power line and the inverter from each other; a second comparator means in which a predetermined second reference value larger than the first reference value is set, for comparing the level of the ripple component with the second reference value; and overhead power line voltage suppressing means for suppressing an increase of the overhead power line voltage when the ripple component is smaller than the second reference value based on a comparison result obtained by the second comparator means.

EFFECTS OF THE INVENTION

According to the present invention, an electric car controller for controlling an electric car, provided with an inverter for receiving power supplied through an overhead power line and regenerating power through the overhead power line during a regenerative braking operation and an induction motor driven by the inverter, includes: overhead power line voltage detecting means for detecting an overhead power line voltage on the overhead power line; ripple component detecting means for detecting a ripple component included in the overhead power line voltage detected by the overhead power line voltage detecting means; a first comparator means in which a predetermined first reference value is set, for comparing a level of the ripple component outputted from the ripple component detecting means with the first reference value; separation means for determining that a power failure occurs when the ripple component is smaller than the first reference value based on a comparison result obtained by the first comparator means and a predetermined time elapses, and electrically separating the overhead power line and the inverter from each other; a second comparator means in which a predetermined second reference value larger than the first reference value is set, for comparing the level of the ripple component with the second reference value; and overhead power line voltage suppressing means for suppressing an increase of the overhead power line voltage when the ripple component is smaller than the second reference value based on a comparison result obtained by the second comparator means. Therefore, it is possible to accurately detect the case of the power failure section and stop the application of the voltage to the overhead power line in a short time at the time of power failure detection without depending on the state of the load.

BEST MODE FOR CARRYING OUT THE INVENTION

EMBODIMENT 1

Figure 1:
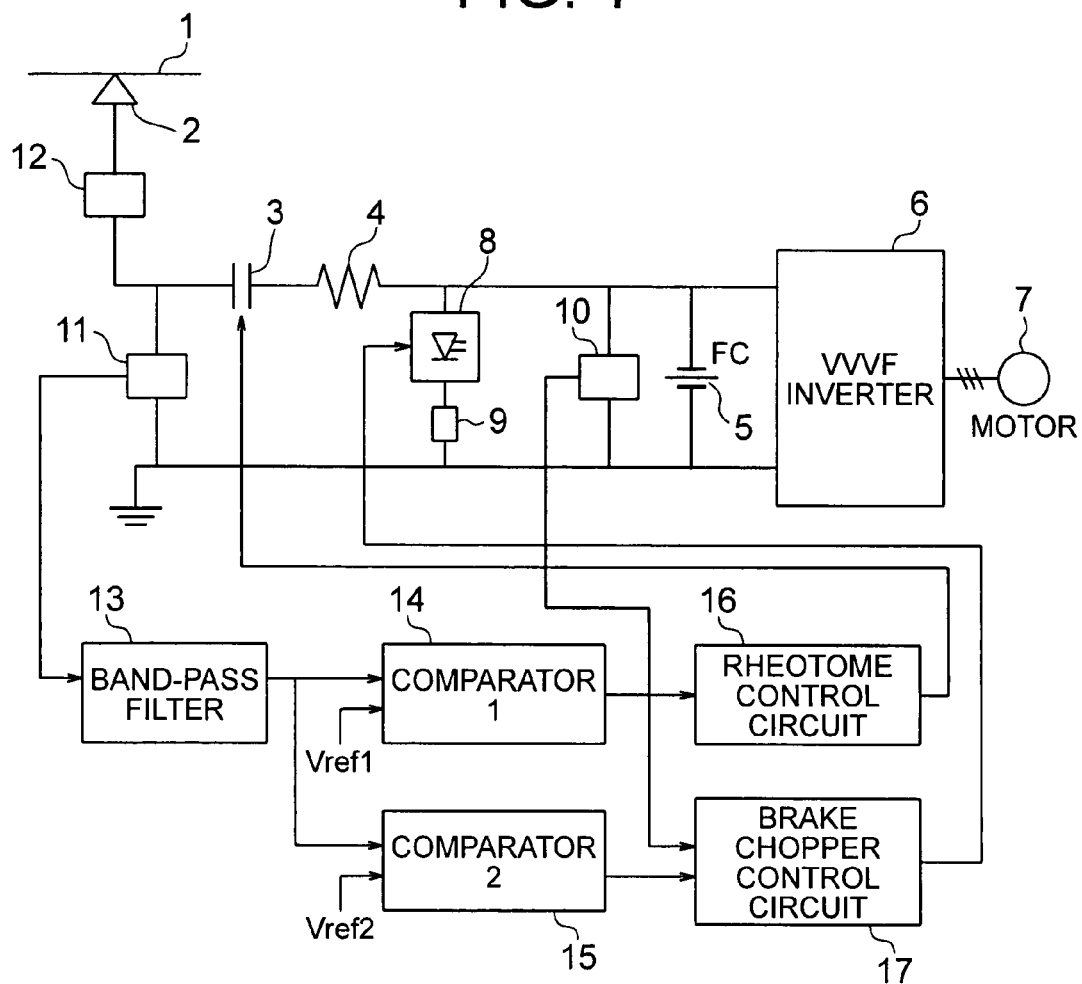
FIG. 1 is a block diagram showing a structure of an electric car controller according to Embodiment 1 of the present invention.

FIG. 1 shows a structure of an electric car controller according to Embodiment 1 of the present invention. As shown in FIG. 1, an overhead power line 1 is connected with a power source side to which power is supplied from an electric power substation. A collector (pantograph) 2 which is in electrical contact with the overhead power line 1 collects direct current power from the overhead power line 1. The collector 2 is connected with a filter reactor 4 and a filter capacitor 5 which compose an input filter circuit through a rheotome 3. The filter capacitor 5 is connected with a three-phase VVVF inverter 6 for converting an inputted direct current voltage into an alternating current voltage. The VVVF inverter 6 receives supplied power through the overhead power line 1 and regenerates power through the overhead power line 1 during a regenerative braking operation.

The VVVF inverter 6 is connected with an induction motor (motor) 7. The induction motor 7 is driven by the VVVF inverter 6. The induction motor 7 is connected with wheels (not shown) provided in a car. The above-mentioned structure forms a main circuit.

In this embodiment, as shown in FIG. 1, a brake chopper 8 which operates during braking is added to the main circuit. The brake chopper 8 is connected in series with a brake resistor 9. The brake chopper 8 and the brake resistor 9 are connected in parallel with the filter capacitor 5. A filter capacitor voltage detector 10 for detecting a voltage of the filter capacitor 5 is provided. A brake chopper control circuit 17 controls the brake chopper 8 based on the detected voltage of the filter capacitor.

An operation of the brake chopper 8 will be briefly described. The brake chopper control circuit 17 controls the driving of a switching element (not shown) provided in the brake chopper 8 such that the detected voltage of the filter capacitor becomes equal to a voltage command value, thereby controlling a conduction ratio. In this case, the brake chopper 8 consumes the energy regenerated by the VVVF inverter 6. Therefore, even an input side becomes a light load during braking, a predetermined electrical braking force, that is, an electrical control torque can be obtained without depending on the state of the load. This is the general operation of the brake chopper 8. In this embodiment, in order to prevent a ripple component from losing depending on the state of the load in a normal power source voltage section, when the ripple component becomes smaller than a predetermined reference value, the brake chopper control circuit 17 operates the brake chopper 8 to increase the conduction ratio.

Then, an increase in overhead power line voltage is suppressed, so the loss of the ripple component of the power source voltage is prevented.

The description returns to FIG. 1. In this embodiment, as shown in FIG. 1, an overhead power line voltage detector 11 for detecting a voltage of the overhead power line 1 and an input current detector 12 for detecting a current inputted to the collector 2 are provided. The overhead power line voltage detector 11 is connected with a band-pass filter 13. The band-pass filter 13 detects a ripple component included in the overhead power line voltage. The band-pass filter 13 is connected with two comparators 14 and 15 (hereinafter referred to as a comparator-1 and a comparator-2) for comparing a voltage level outputted from the band-pass filter with predetermined reference values Vref1 and Vref2. The comparator-1 (reference numeral 14) is connected with a rheotome control circuit 16 for controlling the rheotome 3. As a comparison result obtained by the comparator-1 (reference numeral 14), when a level of the ripple component outputted from the band-pass filter 13 becomes smaller than the predetermined reference value Vref1 and a predetermined time elapses, the rheotome control circuit 16 causes the rheotome 3 to open. The comparator-2 (reference numeral 15) is connected with the brake chopper control circuit 17 as described above. The brake chopper control circuit 17 controls the switching element (not shown) provided in the brake chopper 8 to control the conduction ratio of the brake chopper 8. As a comparison result obtained by the comparator-2 (reference numeral 15), when the level of the ripple component outputted from the band-pass filter 13 becomes smaller than the predetermined reference value Vref2, the brake chopper control circuit 17 operates the brake chopper 8 to increase the conduction ratio.

Next, the operation will be described. The electric car controller according to this embodiment is constructed as described above. When the ripple component of the power source voltage which is generated at the time of rectifying an alternating current power source voltage is lost, the power failure is detected.

Figure 2A:
FIGS. 2A and 2B are explanatory views showing an overhead power line voltage waveform.

A power source voltage of a direct current electric car is normally obtained by full-wave rectification of an alternating current power source voltage of a commercial frequency. Therefore, for example, in the case of a six-phase rectifier circuit, an output thereof includes a ripple having a frequency six times the commercial frequency. A twelve-phase rectifier circuit may be used in some cases. In such the cases, a ripple occurs at a frequency twelve times the commercial frequency. FIG. 2A shows a waveform example of an overhead power line voltage in a state in which the ripple occurs. Whether or not the power source voltage is supplied from an electric power substation can be determined based on the presence or absence of the ripple component. That is, when the voltage is outputted from the electric power substation, a power source voltage ripple component having a frequency six times or twelve times the commercial frequency is detected. When a power failure occurs, the ripple is lost.

In FIG. 1, when a power source frequency is 50 Hz, the center frequency of the band-pass filter 13 on the overhead power line voltage is set to 300 Hz in the case of the six-phase rectifier circuit and to 600 Hz in the case of the twelve-phase rectifier circuit. When the power source frequency is 60 Hz, the center frequency is set to 360 Hz in the case of the six-phase rectifier circuit and to 720 Hz in the case of the twelve-phase rectifier circuit.

Whether or not the above-mentioned ripple component of the overhead power line voltage is equal to or larger than the predetermined reference value Vref1 is checked by the comparator-1 (reference numeral 14). When the ripple component is equal to or smaller than the predetermined reference value Vref1, it is determined to be a power failure section. After a predetermined time elapses, the rheotome 3 is opened by the rheotome control circuit 16 to separate the overhead power line 1 and the main circuit from each other.

In this embodiment, when the electric car enters power failure section, even in the case where the car is on regenerative braking operation, the power failure is detected based on the presence or absence of (not the overhead power line voltage influenced by the state of the load) the ripple component of the power source voltage which depends on only power supply or power failure without being influenced by the state of the load. Therefore, the power failure can be detected regardless of the state of the load in the power failure section.

Figure 2B:

When regenerative braking is operated in the normal power source voltage section, the overhead power line voltage increases because of an insufficient regenerative load. Then, when the overhead power line voltage exceeds a voltage fed from the electric power substation, there is the case where the power source voltage ripple is lost as shown in FIG. 2B in spite of the absence of the power failure section. In this embodiment, the brake chopper 8 is provided in order to prevent such the case from being erroneously detected as the case of power failure. When the ripple component is smaller than the predetermined reference value Vref2, the brake chopper 8 is operated to increase the conduction ratio, thereby suppressing an increase in overhead power line voltage. Therefore, the loss of the ripple component can be prevented to continuously perform power failure detection. Hereinafter, the detailed description will be made.

In FIG. 1, the reference values (Vref1 and Vref2) are set to the comparator-1 (reference numeral 14) and the comparator-2 (reference numeral 15) so as to satisfy Vref1<Vref2. In the normal power source voltage state, when the overhead power line voltage is increased by the regenerative operation, a level of the ripple component of the power source voltage reduces. Then, when it is determined by the comparator-2 (reference numeral 15) that the level is smaller than the level of Vref2, the brake chopper control circuit 17 operates the brake chopper 8 to increase the conduction ratio based on the value. On the other hand, when the level of the ripple component of the power source voltage is larger than Vref2, the brake chopper control circuit 17 operates the brake chopper 8 to reduce the conduction ratio. Note that Vref1 is a set value for detecting that the ripple component on the overhead power line is lost, that is, the power failure occurs. The set value is a value which is closest to 0V, corresponds to a residual characteristic of the band-pass filter 13, and is capable of reliably detecting the power failure. In the case where the overhead-power line is in a normal state, when the overhead power line voltage increases, the ripple component reduces. However, when the ripple component reduces to the level of Vref2, the brake chopper 8 is operated to suppress the increase in overhead power line voltage. At this time, it is necessary to allow the brake chopper 8 to perform control so as to prevent the lapse of predetermined time while the power failure detection operation is performed, that is, while the ripple component reduces to the level of Vref1. Therefore, Vref2 is a set value with a control margin which allows the ripple component to return to a level which exceeds Vref2 again by the operation of the brake chopper 8 after the fact that the ripple component reaches the value of Vref2 is detected.

According to the operation of the brake chopper 8, even in the state in which the regenerative load is a light load, the regenerative braking operation can be performed without causing a state in which the level of the ripple component of the overhead power line voltage reduces to the level of Vref1 during the operation and continues for a predetermined time. Therefore, electric brake can be continuously controlled without the erroneous detection of power failure.

If the supply from the electric power substation is stopped to cause power failure in the normal power source voltage section, the voltage ripple level instantaneously reduces to Vref1 or less. Therefore, the power failure can be detected.

As described above, according to this embodiment, the power failure section is detected based on the presence or absence of the ripple component of the power source voltage, so the power failure section can be detected with high precision without depending on the state of the load. In the normal power source voltage section, the power failure can be accurately detected without being erroneously detected as the power failure section in spite of the state of the regenerative load. In addition, when the power failure is detected, the main circuit can be instantaneously opened to prevent the application of the voltage to the overhead power line 1.

Embodiment 2

Figure 3:
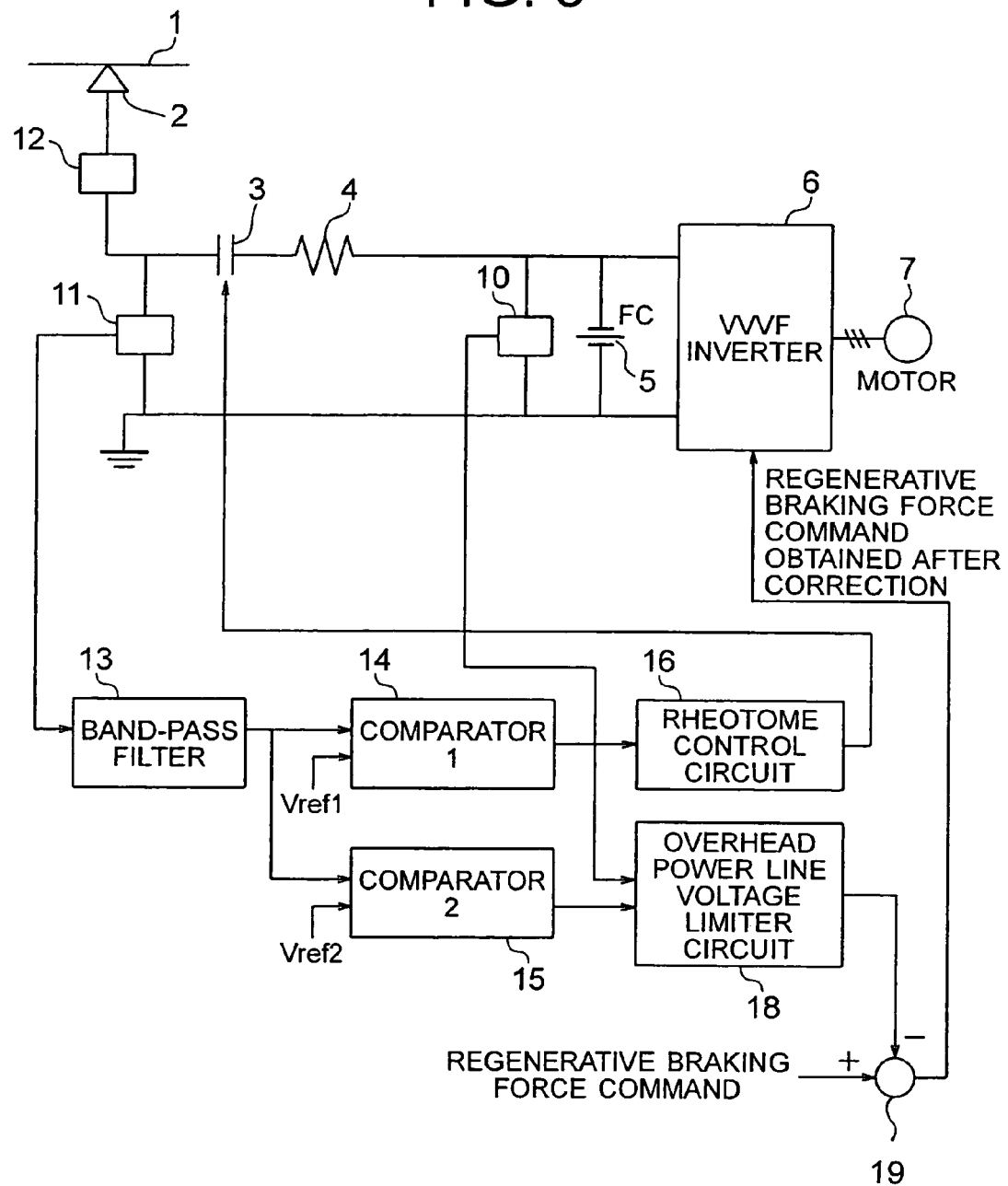
FIG. 3 is a block diagram showing a structure of an electric car controller according to Embodiment 1 of the present invention.

FIG. 3 shows a structure of an electric car controller according to Embodiment 2 of the present invention. As shown in FIG. 3, in the structure of the electric car controller according to this embodiment, reference numerals 1 to 7 and 10 to 16 are identical to those in Embodiment 1 as described above, so the description is omitted here. This embodiment is different from Embodiment 1 in a point that an overhead power line voltage limiter circuit 18 is provided instead of the brake chopper 8, the brake resistor 9, and the brake chopper control circuit 17 in Embodiment 1. Therefore, in this embodiment, not the brake chopper 8 but the overhead power line voltage limiter 18 is operated as a means for preventing the loss of the power source voltage ripple during the regenerative braking operation.

The overhead power line voltage limiter circuit 18 outputs the amount of correction for suppressing a regenerative braking force command value inputted from an outside based on the output of the comparator-2 (reference numeral 15). As shown in FIG. 3, a subtracter 19 is provided in the subsequent stage of the overhead power line voltage limiter 18. The amount of correction from the overhead power line voltage limiter circuit 18 is subtracted from the regenerative braking force command value inputted from the outside. Therefore, the regenerative braking force command value corrected by the overhead power line voltage limiter circuit 18 is inputted to the VVVF inverter 6. The VVVF inverter 6 performs the braking operation in response to the command value.

The more detailed description will be made. In FIG. 3, the reference values (Vref1 and Vref2) of the comparator-1 (reference numeral 14) and the comparator-2 (reference numeral 15) are set so as to satisfy Vref1<Vref2. In the normal power source voltage state, in the case where the regenerative load is a light load, when the overhead power line voltage is increased by the regenerative operation to reduce a level of the ripple component of the power source voltage, and when the reduced level becomes smaller than the level of the reference value Vref2 of the comparator-2 (reference numeral 15), the overhead power line voltage limiter 18 increases an output based on the value to reduce the regenerative braking force command value. Therefore, the regenerative braking force command is suppressed and the amount of regenerative braking force is reduced to suppress an increase in overhead power line voltage. Even when the amount of regenerative braking force is reduced, an insufficient amount thereof is complemented by an air braking force in a normal car system. Therefore, there is no problem on a braking force for the car. When the level of the ripple component of the power source voltage exceeds Vref2, the output of the overhead power line voltage limiter 18 reduces.

According to the above-mentioned operation, even in the state in which the regenerative load is the light load, the regenerative braking operation can be performed without causing a state in which the level of the ripple component of the overhead power line voltage reduces to the level of Vref1 during the operation and continues for a predetermined time. Therefore, electric brake can be continuously controlled without the detection of power failure.

If the power failure occurs, the level of the ripple component instantaneously reduces to Vref1 or less. Therefore, the power failure can be detected.

As described above, according to this embodiment, the power failure section is detected based on the presence or absence of the ripple component of the power source voltage, so the power failure section can be detected with high precision without depending on the state of the load. In the normal power source voltage sections, a section is not erroneously detected as the power failure section in spite of the state of the regenerative load. When the power failure is detected, the main circuit can be instantaneously opened to prevent the application of the voltage to the overhead power line 1.

The invention claimed is:

1. An electric car controller for controlling an electric car, which is provided with an inverter for receiving power supplied through an overhead power line and regenerating power through the overhead power line during a regenerative braking operation and an induction motor driven by the inverter, the electric car controller comprising:
    overhead power line voltage detecting means for detecting an overhead power line voltage on the overhead power line;
    ripple component detecting means for detecting a ripple component included in the overhead power line voltage detected by the overhead power line voltage detecting means;
    a first comparator means in which a predetermined first reference value is set, for comparing a level of the ripple component outputted from the ripple component detecting means with the first reference value;
    separation means for determining that a power failure occurs when the ripple component is smaller than the first reference value based on a comparison result obtained by the first comparator means and electrically separating the overhead power line and the inverter from each other;
    a second comparator means in which a predetermined second reference value larger than the first reference value is set, for comparing the level of the ripple component with the second reference value; and
    overhead power line voltage suppressing means for suppressing an increase of the overhead power line voltage when the ripple component is smaller than the second reference value based on a comparison result obtained by the second comparator means.

2. The electric car controller according to claim 1, wherein the overhead power line voltage suppressing means comprises:
    a brake chopper connected in parallel with the inverter; and
    a brake chopper control circuit for controlling a conduction ratio of the brake chopper based on a value of the ripple component when the ripple component is smaller than the second reference value.

3. The electric car controller according to claim 1, wherein the overhead power line voltage suppressing means comprises:
    regenerative braking force command value input means into which a regenerative braking force command value in inputted; and
    regenerative braking force command value correcting means for subtracting the regenerative braking force command value inputted into the regenerative braking force command value input means based on a value of the ripple component when the ripple component is smaller than the second reference value.

4. The electric car controller according to claim 1, further comprising:
    a rheotome control circuit coupled to the first comparator means, the rheotome control circuit configured to open and close a rheotome.

* * * * *